(12) United States Patent
Gautier et al.

(10) Patent No.: US 9,681,175 B2
(45) Date of Patent: Jun. 13, 2017

(54) METHOD FOR DOWNLOADING CONTENT ACCORDING TO COMMUNICATION PARAMETERS, AND ASSOCIATED CONTENT RECEIVER

(71) Applicant: THOMSON LICENSING, Issy de Moulineaux (FR)

(72) Inventors: Eric Gautier, Rennes (FR); Stephane Gouache, Cesson Sevigne (FR); Anthony Laurent, Vignoc (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/066,681

(22) Filed: Oct. 29, 2013

(65) Prior Publication Data

US 2014/0123202 A1    May 1, 2014

(30) Foreign Application Priority Data

Oct. 30, 2012   (FR) ...................................... 12 60381

(51) Int. Cl.
*H04N 7/173* (2011.01)
*H04N 21/433* (2011.01)
*H04N 21/231* (2011.01)
*H04L 29/06* (2006.01)
*H04L 29/08* (2006.01)

(52) U.S. Cl.
CPC ....... *H04N 21/433* (2013.01); *H04L 65/4084* (2013.01); *H04L 65/608* (2013.01); *H04L 65/80* (2013.01); *H04N 21/231* (2013.01); *H04L 67/02* (2013.01)

(58) Field of Classification Search
USPC .................................................. 725/74–107
See application file for complete search history.

(56) References Cited

U.S. PATENT DOCUMENTS

| | | | |
|---|---|---|---|
| 8,701,137 B2* | 4/2014 | Katpelly | G11B 20/10527 725/25 |
| 8,887,224 B2* | 11/2014 | Ganesan | G06F 17/30017 725/115 |
| 2002/0110149 A1* | 8/2002 | Roberts | H04L 29/06 370/477 |
| 2010/0058401 A1* | 3/2010 | Beyabani | 725/93 |
| 2011/0093605 A1* | 4/2011 | Choudhury et al. | 709/231 |
| 2011/0182380 A1* | 7/2011 | Muhammad | H04L 27/2628 375/295 |

(Continued)

FOREIGN PATENT DOCUMENTS

| | | |
|---|---|---|
| EP | 2360923 | 8/2011 |
| WO | WO-2011047335 | 4/2011 |

OTHER PUBLICATIONS

Search Rept:Apr. 19, 2013.

*Primary Examiner* — Mushfikh Alam
(74) *Attorney, Agent, or Firm* — Tutunjian & Bitetto, P.C.

(57) ABSTRACT

A method for downloading multimedia contents is disclosed. The multimedia contents exists in at least two versions. Each of the versions corresponds to a different required transmission bit rate and each of the versions is temporally divided into chunks corresponding to a determined duration, one chunk being identified by an item of information representative of a temporal position i and by an item of information representative of a version j. A content receiver implementing this method is also described.

36 Claims, 6 Drawing Sheets

(56) References Cited

U.S. PATENT DOCUMENTS

| | | | |
|---|---|---|---|
| 2012/0179834 A1* | 7/2012 | van der Schaar | H04N 21/23439 709/231 |
| 2012/0324123 A1* | 12/2012 | Fox et al. | 709/231 |
| 2013/0174191 A1* | 7/2013 | Thompson et al. | 725/23 |
| 2013/0179584 A1* | 7/2013 | Mizunashi | 709/230 |
| 2013/0212152 A1* | 8/2013 | Kuruvilla et al. | 709/203 |
| 2013/0268761 A1* | 10/2013 | Giladi | 713/170 |
| 2014/0013376 A1* | 1/2014 | Xu | H04N 21/25 725/116 |
| 2014/0026140 A1* | 1/2014 | Gupta et al. | 718/104 |
| 2014/0040915 A1* | 2/2014 | Chen et al. | 718/107 |
| 2014/0059171 A1* | 2/2014 | Le Leannec | H04L 65/4092 709/217 |
| 2014/0198173 A1* | 7/2014 | Willig | H04N 7/15 348/14.03 |

* cited by examiner

METHOD FOR DOWNLOADING CONTENT ACCORDING TO COMMUNICATION PARAMETERS, AND ASSOCIATED CONTENT RECEIVER

This application claims the benefit, under 35 U.S.C. §119 of French Patent Application 1260381, filed Oct. 30, 2012.

FIELD OF THE INVENTION

The invention relates to the transmission of multimedia contents in download mode.

It is recalled that downloading consists in transmitting to at least one content receiver, via a communication network (wired or wireless), a content so that it can be used later, following complete download. This type of transmission can be carried out by means of various download protocols, such as for example HTTP or FTP. It is also recalled that unlike downloading, streaming consists in successively transmitting to at least one content receiver, via a communication network (wired or wireless), parts (or "chunks"—microfiles) of a content so that they can be played live on-the-fly. This transmission type can be implemented by means of various streaming protocols, such as for example H264 or MPEG-TS on RTP or MPEG-TS on UDP, HTTP streaming, or more recently HTTP adaptive streaming.

By "multimedia content" is understood here a set of audio and video data prepared in a way adapted to its consumption in a way to optimise its transmission. It could thus involve, for example, a television programme or videos or a game containing for example animations and/or textures and/or 3D models for which the complexity can be reduced to reduce the quantity of information to be transmitted. Note that the content can possibly be of stereoscopic type.

BACKGROUND OF THE INVENTION

The available bandwidth of a communication network is a parameter that fluctuates over time, sometimes significantly and/or for extensive periods, even when the network is of a domestic or residential type. This available bandwidth can be simultaneously used by different applications or different services, possibly by different users, the functioning of an application or a service can therefore be disturbed or altered when the bandwidth becomes weak. This is particularly the case for applications or services relating to the obtaining of a multimedia content. In fact, if the bandwidth offered at a given instant by a communication network is momentarily incompatible with the bit rate for the transmission of data of a multimedia content, some of the data of this multimedia content may not be received by the requesting content receiver in time, and so the latter must delay the restitution.

As disclosed in EP 2 360 923 A1 directed at adaptive streaming, http adaptive streaming techniques are instructed to generate from a same content several different versions that correspond to different transmission binary bit rates. When a content receiver, connected to a communication network, wants to recover a content via the network, the version of the content that is best adapted to the conditions offered by the communication network at the chosen instant will be received by it, this avoids frozen or degraded images. This continuous selection of versions of a content according to the available bandwidth enables some real time adaptation to the fluctuations of the network for streaming broadcasts.

WO 2011/047335 A1 discloses an adaptive streaming manager that monitors at least one parameter of a user terminal and allow the user terminal, for instance a mobile device, to vary the quality of a multimedia stream on certain conditions such as network bandwidth, battery conditions, direction of travel of the device. As EP 2 360 923 A1, WO 2011/047335 A1 is directed at adapting stream quality according to real time parameters for streaming content.

However, for downloading content, there is no known technique to adapt the download time to network fluctuations or other communication constraints. In the prior art, a user waits until the content is downloaded before using it, at best he is informed of the waiting time. It is understood then that when a user wants to respect certain constraints called communication constraints such as for example the waiting time before the downloaded content is available, the power consumed by the receiver during the download, the quantity of data downloaded (for example to comply with an economic billing model based on the quantity of data received) or the limitation of transmission bandwidth (for example to reserve bandwidth for other services), a solution for downloading contents constrained by these communication parameters would be desirable.

SUMMARY OF THE INVENTION

The purpose of the invention then is to improve the situation, and more specifically to enable a content downloading device to obtain a version of multimedia content that is continuously adapted to communication parameters defined by a user, in particular to a limited download time and an available bandwidth.

For this purpose, the invention proposes particularly a method for downloading multimedia contents, the multimedia contents existing in at least two versions, each of the versions corresponding to a different required transmission bit rate, each of the versions being temporally divided into chunks corresponding to a determined duration, one chunk being identified by an item of information representative of a temporal position i and by an item of information representative of a version j.

This method is characterized by the fact that it comprises, for at least one temporal interval ti' corresponding to the duration of a chunk identified by the information representative of the temporal position i', the following steps carried out in a contents receiver for:

a) sending a request to receive at least one chunk identified by an item of information representative of a determined temporal position i and by an item of information representative of a determined version j, wherein the item of information representative of temporal position i of a chunk to be downloaded before the end of the temporal interval ti' is determined so that a total download duration of the content is less than a maximum download duration of the content, and wherein the item of information representative of a version j is determined according to an available transmission bit rate so that the chunk identified by the item of information representative of the determined temporal position i and by the item of information representative of the version j are downloaded before the end of the temporal interval ti', b) receiving the identified chunk.

The method according to the invention can comprise other characteristics that can be taken individually or in combination, and notably:

the steps a) to b) are iterated for a plurality of items of information representative of a temporal position i of chunks to be downloaded before the end of the temporal interval ti', for an initialization phase corresponding to a temporal interval ti' less than a first threshold, the item of information representative of a determined version j corresponds to the minimum transmission bit rate whatever the available transmission bit rates, the item of information representative of a determined version j corresponds to the minimum required transmission bit rate when the plurality of chunks identified by the items of information representative of a temporal position i to be downloaded before the end of the temporal interval ti' is not downloaded, the steps a) to b) are iterated for a plurality of temporal intervals ti' so that the set of chunks of a content is downloaded, in determining an item of information representative of a temporal position i of a chunk to be downloaded before the end of the temporal interval ti', the method comprises the addition of a guard interval for the total duration of the download, it comprises a step of downloading at least one description file comprising an item of information representative of versions of a content and describing the respective required transmission bit rates so that the versions j can be determined.

In addition, when the plurality of chunks identified by the items of information representative of temporal position i to be downloaded before the end of the temporal interval ti' are downloaded, this method is characterized by the fact that it comprises the following steps:

c) sending a request to receive at least one chunk identified by an item of information representative of a determined temporal position i+1 and by an item of information representative of a determined version j, wherein for the chunk identified by an item of information representative of the following temporal position i+1, the item of information representative of the determined version j is determined according to an available transmission bit rate so that the chunk identified by an item of information of the following temporal position i+1 and by an item of information representative of the determined version j are downloaded before the end of the temporal interval following ti'+1, d) receiving said identified chunk.

The method according to the invention can comprise other characteristics that can be taken individually or in combination, and notably:

the steps c) to d) are iterated until the end of the temporal interval ti' it comprises a step of estimation of the available transmission bit rate for a temporal interval ti'+1 from at least one measured value of transmission bit rate for the temporal interval ti', the step of estimation of the available transmission bit rate for the temporal interval ti'+1 comprises the allocation of a constant value to the available transmission bit rate equal to a measured value of transmission bit rate for the temporal interval ti', the step of estimation of the available transmission bit rate comprises the allocation of a value to the available transmission bit rate for the temporal interval ti'+1 as a linear function of two measured values of transmission bit rate for the preceding temporal intervals ti' and ti'−1, the step of estimation of the available transmission bit rate for the temporal interval ti'+1 comprises the allocation of a value to the available transmission bit rate a non-linear function of at least three measured values of transmission bit rate for the preceding temporal intervals.

The invention also proposes a content receiver comprising a multimedia content downloading device implementing the method according to one of the preceding claims.

Such a content receiver can, for example, be in the form of a set-top box type unit, a decoder, a residential or home gateway, a games console, a fixed or portable computer, a Personal Digital Assistant or a computer tablet.

BRIEF DESCRIPTION OF THE DRAWINGS

Other characteristics and advantages of the invention will appear upon examination of the detailed description hereafter, and the annexed drawings, wherein.

The annexed drawings can be used not only to complete the invention, but also to contribute to its definition, if necessary.

DETAILED DESCRIPTION OF PREFERRED EMBODIMENTS

The purpose of the invention is particularly to propose a device D for obtaining multimedia contents intended to obtain multimedia contents, in a download mode, for at least one content receiver CR coupled to a communication network N so that communication constraints, such as for example a maximum downloading time, are respected.

Hereafter, it is considered as a non-restrictive example that the communication network N is a network consisting of the Internet network connected notably to a content receiver CR via an xDSL access network. But the invention is not limited to this type of communication network. In fact, the communication network N can be wired or wireless.

Thus, it could equally involve a wired cable or fibre type network, or a mobile or cellular network or WLAN ("Wireless Local Area Network"—possibly of type 802.11 (or WiFi) or WiMAX)), or again of a Bluetooth type wireless short range network. The communication network N can also consist of distinct sub-networks with for example a unidirectional broadcast network, for example of television type, and a bi-directional network, for example of broadband Internet access type (xDSL).

Moreover, it is considered hereafter, as a non-restrictive example that the content receiver CR is a Set-Top Box (STB). But, the invention is not limited to this type of content receiver. In fact it relates to any content receiver type that can be connected to at least one communication network to receive multimedia contents, and is able to render a multimedia content. Consequently, it could also involve for example a decoder, and residential gateway, a home gateway, a fixed or portable computer, a mobile telephone (possibly of Smartphone type) and Personal Digital Assistant (PDA) a computer tablet or a games console.

In addition, it is considered hereafter, as a non-restrictive example, that the multimedia contents are videos. But, the invention is not limited to this type of multimedia content. In fact it relates to any type of multimedia content available in the form of data files or file parts (or chunks), and particularly television programmes, games, movies, sports events, educational contents, and Computer Generated Imagery (CGI).

Figure 1:
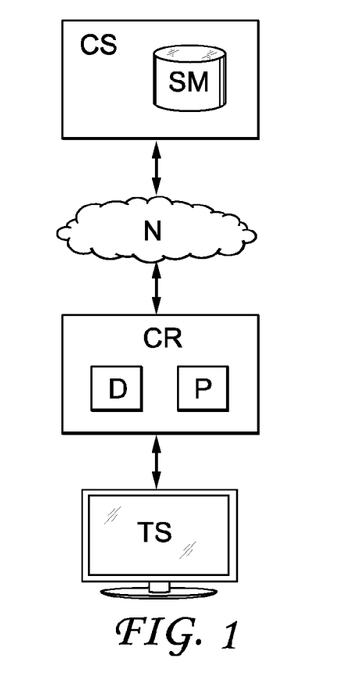
FIG. 1 shows in a diagrammatic and functional way a communication network to which is connected a multimedia content server and a content receiver, equipped with a content obtaining device according to an embodiment of the invention, FIG. 2 schematically shows six different versions of a same content corresponding respectively to six different required transmission binary bit rates FIG. 3 schematically shows an example of temporal progression (t) of the data transmission Bit Rate (BR) and the obtaining of chunks of a content via a method for obtaining contents according to an embodiment of the invention FIG. 4 diagrammatically shows, according to another representation, a same example of temporal progression (t) of the data transmission Bit Rate (BR) and the obtaining of chunks of a content via a method for obtaining contents according to an embodiment of the invention, FIGS. 5a, 5b and 5c diagrammatically show an example of temporal progression (t) of the data transmission bit rate (BR) of a content and the estimation of this data transmission bit rate (BR) according to 3 embodiments of the invention.

A communication network N is diagrammatically shown on FIG. 1 to which is connected a content server CS, able to store (multimedia) contents, and a content receiver CR, intended to decode (multimedia) contents transmitted by the server CS (on request from a content obtaining device D according to the invention).

For example, and as shown non-restrictively, the set-top box CR is coupled to at least one television set TS responsible for rendering on a screen the contents that it has decoded and that are for example from a server CS via the communication network N. According to a variant, and as shown non-restrictively, the set-top box CR also comprises a play module P able to decode contents once downloaded and render them on a simple display device, such as a screen. The set-top box CR comprises a device D to obtain contents to be downloaded responsible for requesting the chunks of contents adapted to the communications parameters. It is responsible for selecting chunks of contents (i.e. the parts or "chunks" selection algorithm described hereafter), transmitting HTTP requests and storing the downloaded chunks in storage means.

The (contents) server CS is for example responsible for storing different versions Vj of contents in storage means SM. These storage means SM can be in any form known to those skilled in the art, including software applications. Consequently it could be a memory.

Figure 2:
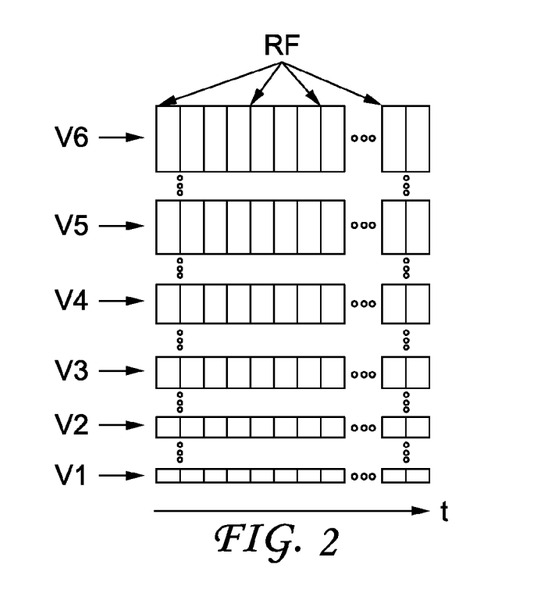

It is understood here by "different versions of a content" versions that correspond to different transmission binary bit rates BRj. FIG. 2 diagrammatically shows six different versions V1 to V6 (j=1 to 6) of a same content corresponding respectively to six different transmission binary bit rates BRj, such as for example 1 Mbps (megabits per second) for the first version V1, 2 Mbps for the second version V2, 3 Mbps for the third version V3, 4 Mbps for the fourth version V4, 5 Mbps for the fifth version V5 and 6 Mbps for the sixth version V6.

Each version Vj of a content is constituted of a multiplicity of parts (or chunks, micro-files) of identical duration. In the example of FIG. 2, each chunk of a version Vj is formed by a rectangle for which the height is representative of the corresponding transmission binary bit rate BRj.

The number of versions of a same content can be equal to any value at least equal to two (2).

The versions Vj of a same content corresponding for example to different resolutions or different compression rates, and that thus correspond to different required transmission bit rates.

It is also noted that the versions Vj of a same content can, for example, have been generated by coding by means of a video compression technique, such as for example MVC ("Multiview Video Coding"), AVC ("Advanced Video Coding'), SVC ("Scalable Video Coding'), MPEG2, H264, and more generally any type of video compression enabling encapsulation in a format dedicated to transport in streaming mode, including audio data.

It is also noted, as shown in FIG. 2, that the versions Vj of a same content preferentially comprise reference fields RF for which the temporal positions are identical from one version to another. In others words, the chunks are temporally aligned thanks to reference fields RF. However the duration of each chunk may vary along the content for a determined version. It is recalled that the reference fields RF are those that enable random access to a chunk (or part) of a content that is transmitted in streaming mode. In the example shown, each reference field RF is placed at the start of a chunk (or part) of a version Vj of content. This enables a decoder P installed on a content receiver CR to pass from one version Vj to another Vj', on request, at precise instants (that are the transmission instants of reference fields RF) without inducing a visual artefact (typically each video chunk starts and possibly ends with a key image for a transition from one chunk to another that is invisible to the user).

It is also noted that the versions Vj of each content are preferentially stored in correspondence with at least one descriptive file that describes their respective binary bit rates BRj and their respective quantities of data. Each descriptive file is for example in M3U8 format (possibly one per binary bit rate) or MPD ("MPEG DASH" (MPEG Dynamic Adaptive Streaming over HTTP)). Advantageously this/these descriptive file(s) inform the content receiver of the existence of different versions and corresponding required transmission bit rates.

The versions Vj, that are stored in the server CS, are intended to be transmitted on request to at least on content receiver CR, on request from a multimedia content obtaining device D according to the invention.

It is noted that a multimedia content obtaining device D can be associated with at least one content receiver CR. It is understood here by "associated" both the fact of being an integral part of the content receiver CR (as illustrated in a non-restrictive manner), as well as the fact of being coupled directly to the content receiver CR. Consequently, a multimedia content obtaining device D can be realised in the form of software (or computer) modules, or a combination of electronic circuits and software modules.

One advantageous idea of the invention consists in using the contents existing in known different versions from HTTP adaptive streaming for downloading in a multimedia content obtaining device. The content prepared as described above is stored in the storage means of a HTTP server. At the start of the download session, the content obtaining device recovers a descriptive file that lists the available versions of the content. The content obtaining device then launches the download session while constantly monitoring the available bandwidth of the network and requesting the content chunks according to the selection algorithm described hereafter respecting the communication constraints among which is a download total time of the maximum content.

It can be noted that the measurement (or monitoring) of the available bandwidth is carried out for a determined duration, for example the duration of chunks (or microfiles). It is also considered that the measurement is very close to the bandwidth actually available. In addition it is considered that the server CS must have entirely delivered a chunk before delivering the next. The measurement of this bandwidth can be carried out using any known technique for measurement of bandwidth on the network.

Figure 3:
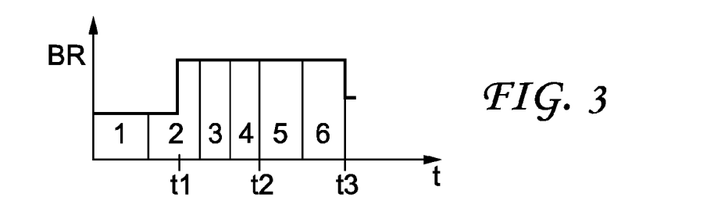

The download duration of a chunk is a function of the available bandwidth also called data transmission bit rate. FIG. 3 diagrammatically shows an example of temporal progression (t) of the data transmission bit rate (BR) and the obtaining of chunks of a content via a method for obtaining contents according to an embodiment of the invention. The theoretical instant, respectively t1, t2 and t3, where the content obtaining device consumes, for example by playing, respectively the chunks 1, 2 and 3, is represented by a vertical line. This instant corresponds to the temporal position of reference fields RF for the successive chunks of a version Vj of content. More generally the temporal interval during which the chunk identified by the item of information representative of the temporal position i is consumed, is also noted ti. To simplify the description, it is considered that the temporal intervals ti are of an identical determined duration and the item of information representative of the temporal position i, is called temporal index i. However, a variant according to which the duration of temporal intervals varies from one position to another, but is aligned from one version to another is compatible with the invention. This notation will be used in all of the figures that follow. Each surface noted 1 to 6 represents a chunk corresponding to a temporal index from 1 to 6 of the content to be downloaded. In FIG. 3, the chunks correspond to a same transmission binary bit rate, that is to say they correspond to a same quantity of data. Thus all of the surfaces 1 to 6 have the same area. The progression of the bandwidth measured is represented by thresholds.

The download duration of a chunk i is equal to the required transmission bit rate (BRi) of the chunk divided by the available transmission bit rate related to the duration of the temporal interval ti.

Figure 4:
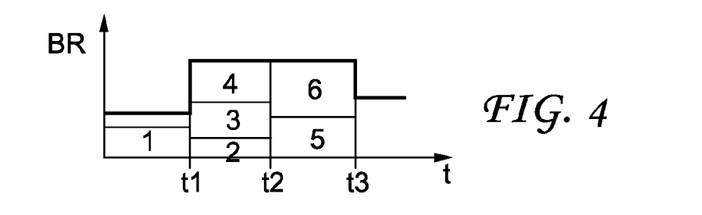

With the representation of FIG. 3, if it is easy to indicate exactly when the downloading of one of the chunks starts and when it ends, it is more difficult to indicate for each duration or consumption or playing of a chunk, which chunks are available. FIG. 4 diagrammatically shows, according to another representation, the same example of temporal progression (t) of the data transmission bit rate (BR) and the obtaining of chunks of a content via a method for obtaining contents according to an embodiment of the invention. This representation improves the readability and guarantees that all chunks of a given type have the same size.

Figure 5A:
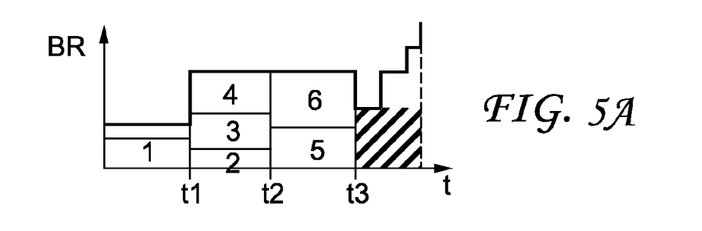
Figure 5B:
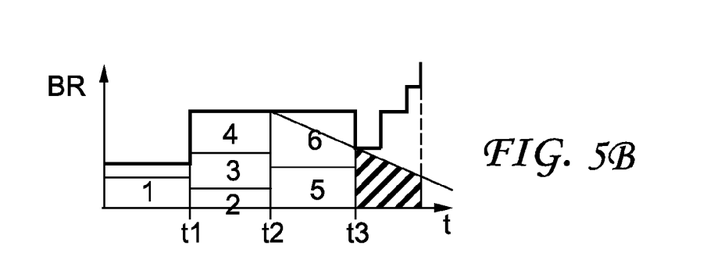
Figure 5C:
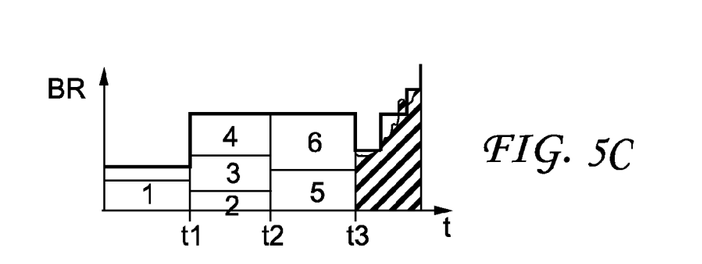

To carry out the request for next chunks to be downloaded, the notion of estimated quantity of available bytes is introduced in FIGS. 5a, 5b and 5c. They are used to verify if it is possible to download a given chunk in a given time. The estimated quantity of available bytes is calculated according to the available bandwidth BR resulting from a measurement or its estimation. According to a variant, the measurement of the bandwidth is carried out at each temporal interval corresponding to a chunk of the contents being played. An estimation of the bandwidth for the next temporal interval is calculated from preceding measurements of the available bandwidth. Thus the content obtaining device can roughly predict the number of bytes that could be downloaded according to the estimation or the measurement of the bandwidth for the duration of a temporal interval. Those skilled in the art will appreciate that, the more frequently the measurement of the available bandwidth is carried out, the more precise will be the estimation of next bandwidth. However, the measurements of the bandwidth generally lead to useless traffic using network resources, the number of measurements should therefore be limited.

FIGS. 5a, 5b and 5c diagrammatically show an example of temporal progression (t) of the data transmission bit rate (BR) of a content and the estimation of this data transmission bit rate (BR) according to 3 modes of estimation of the bandwidth for the next temporal interval. In FIG. 5a, the bandwidth for the duration of the interval ti+1 is constant and equal to the value of the bandwidth measured for the current interval ti. In FIG. 5b, the estimation of the bandwidth ti+1 is a linear estimation integrating two reference values, namely the value of bandwidths measured respectively for the current interval ti and the preceding interval ti−1. According to a more precise embodiment shown in FIG. 5c, the estimation of the bandwidth uses a non-linear model using three reference points. Advantageously any estimation model for the bandwidth using values previously measured is compatible with the invention.

The estimation of the bandwidth is used to calculate the estimated quantity of available bytes represented by the area of the surface shaded on FIGS. 5a, 5b and 5c.

The device D is also configured, once it has determined for a requested content an estimated quantity of bytes available for a temporal interval ti, to determine a version Vj of this content that is adapted to the communication parameters, and transmit a request to recover at least one chunk of this determined content version Vj. It is noted that this recovery is carried out in a download mode.

More generally, the problem that must be resolved is to download a content of a given duration expressed in number of temporal intervals ti, in a time equal to a download duration limit also expressed in number of temporal intervals ti. The problem then returns to the downloading of an average number of chunks (or parts) per temporal interval ti by dividing the total duration of the content by the maximum download duration limit, these durations being expressed in temporal intervals ti (in the variant described, the duration of temporal intervals is identical). According to the invention the download duration limit is a communication parameter to be respected. Advantageously other communication parameters, such as the electricity consumption of the device for example, also reduce to setting the maximum download time limit. It is considered that to respect the maximum level of electricity consumption, the device must be active, able to send requests and receive a content during a limited time. The device D is thus equipped to implement an iterative method for obtaining chunks according to the temporal index i of each of the chunks to be downloaded comprising a selection of the version Vj to be downloaded respecting a maximum download time for the content.

Figure 6:
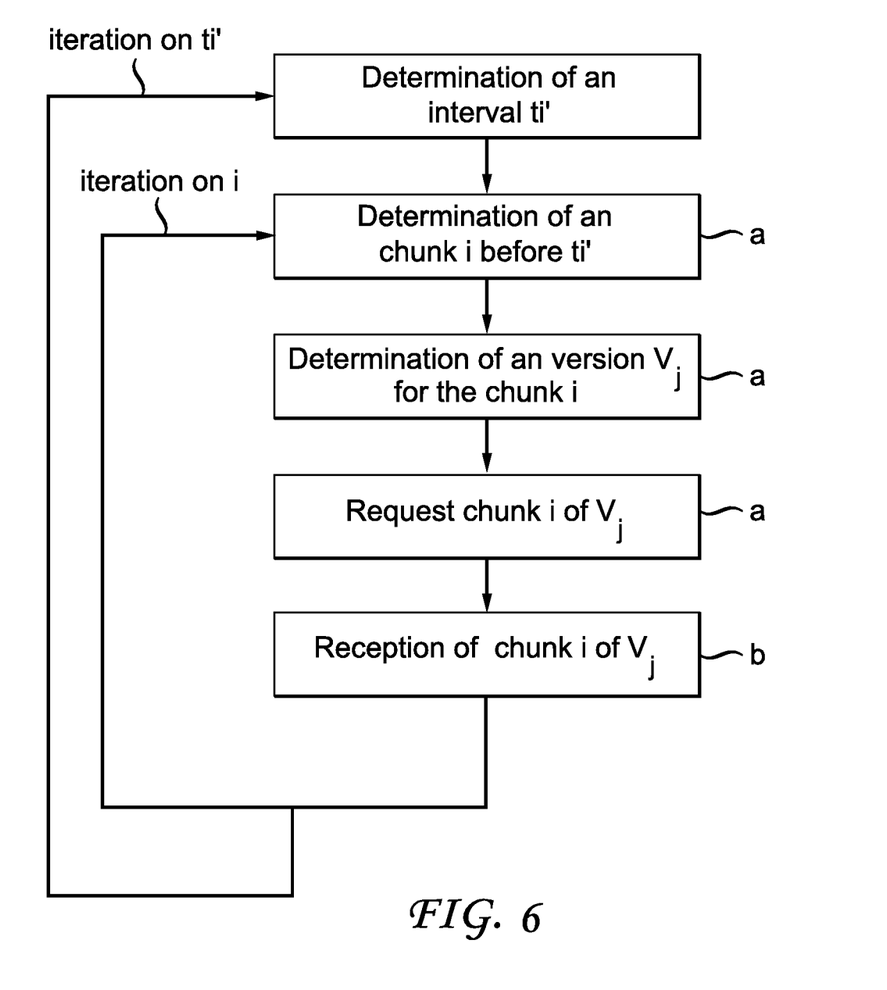
FIG. 6 shows the steps of the method for obtaining contents according to an embodiment of the invention and FIGS. 7a, 7b and 7c diagrammatically show an example of the law of temporal progression for the obtaining of chunks of a content via a method for obtaining contents according to 3 embodiments of the invention.

FIG. 6 shows the steps of the method for obtaining contents according to an embodiment of the invention. In the description of FIG. 6, the distinction was made between the index i of the chunk to be downloaded and the index i' of the temporal interval during which this download is carried out.

According to a variant, a guard interval is added to the download duration of chunks. This guard interval corresponds to a margin taken over the total download time. The guard interval is expressed as a fraction of the temporal interval ti or a number of chunks to be downloaded. It is then added to the average number of chunks (or parts) to be downloaded per temporal interval. Advantageously this variant enables compensation for a poor estimation of bandwidth. Thus, between the start of downloading and the end of the temporal interval ti', the number of chunks of a content downloaded is at least equal to the average number of chunks per temporal interval multiplied by the number of temporal intervals elapsed since the start (corresponding then to the index i') to which is added the guard interval expressed in number of chunks. According to refinements of this variant, the guard interval can be taken into account in the calculation of the number of chunks at any instant of the download according to the temporal interval ti'. It can be taken into account from the start of the download, in the middle of the download or at least a certain number of intervals before the end of the download duration. According to other refinements of this variant, the value of the guard interval can vary during the download according to its advancement.

The method for downloading relies on an iterative method on the successive temporal intervals. In fact, as previously described, the problem of downloading within a maximum duration is reduced to the downloading of an average number of chunks (or parts) per temporal interval ti'. Thus, the set of chunks from 0 to i that must be downloaded before the end of this interval, can be calculated for the temporal interval ti'. The steps are thus iterated for the different temporal intervals ti' until the downloading of the content is completed, that is to say until the depletion of the chunks i to be downloaded. This depletion occurs when the transmission bit rate enables the content to be downloaded within a duration that is less than the maximum download duration. For each temporal interval ti', the method for downloading also relies on an iterative method on the indexes of chunks i. Advantageously the indexes of chunks to be downloaded i are processed sequentially according to an increasing order from k to k+n where k and n are two natural integers. However the invention is not limited to this embodiment, and the chunks can be required simultaneously.

During a first sub-step, a temporal index chunk i is determined as to be downloaded if it belongs to a set of chunks to be downloaded before the end of the temporal interval ti' as defined above with respect to the average number of chunks to be downloaded.

During a second sub-step, a version is determined so that the chunk corresponding to this version respects the maximum downloading time constraint while offering the user a maximum level of quality for the content. As described previously, the duration of downloading of the chunk i is a function of the version Vj corresponding to a transmission binary bit rate BRj and the transmission binary bit rate available for the temporal interval ti'. Different variables resulting from the duration of the temporal interval ti', from the quantity of data to be downloaded for the chunk i (the required transmission bit rate BRj) according to different versions Vj and the available bandwidth are calculated. Thus the total number of available bytes, that is to say that can be downloaded during the temporal interval ti', according to available bandwidth, is calculated for the current temporal interval ti'. The number of remaining available bytes, that is to say not having been used to download the bytes of a chunk i during the current temporal interval ti', is also calculated. Finally as the chunk i is being downloaded, the number of bytes of the chunk i that have been downloaded within the current temporal interval ti' is also calculated. The number of bytes remaining to be downloaded of the chunk i, that is to say that could not be downloaded during the interval ti' is finally calculated. These bytes will be downloaded during the next time interval, namely ti'+1. Finally, the number of available bytes being equal to the total number of available bytes from which are removed the number of bytes remaining to be downloaded from the preceding chunk, represents the number of bytes available during a given time interval before the start of the download during this temporal interval.

In addition, for each chunk i to be downloaded the versions Vj of different contents are defined. The example that follows is limited to 3 versions, namely V1, V2 and V3. The version V3 corresponding to the transmission binary bit rate TR3 corresponds to a higher (or maximum) bit rate. The version V2 corresponding to the transmission binary bit rate TR2 corresponds to an intermediate (or medium) bit rate. And the version V1 corresponding to the transmission binary bit rate TR1 corresponds to a lower (or minimum) bit rate.

Thus during second sub-step, a download duration for the chunk index i using variables previously described is calculated for the different required transmission binary bit rates corresponding to the different versions Vj. During the initialization phase corresponding to the first temporal interval, a strategy implemented by the invention comprises the choice of versions of chunks to be downloaded in such a way that the number of chunks downloaded converges as rapidly as possible with the average number of chunks to be downloaded per time interval. According to different embodiments shown in FIG. 7a, 7b or 7c, it can be seen that three time intervals are required to converge on FIG. 7a, two in FIG. 7b and one on FIG. 7c. It will be noted that the table on the right in each figure indicates the correspondence between the i indexes of chunks to be downloaded and time intervals corresponding to the chunk i'. According to a first variant in which the number of bytes available in the time interval ti' does not enable downloading of the set of chunks i to be downloaded for this interval, the version j corresponding to the lower transmission binary bit rate (namely V1 in the example) is selected in a way to best utilise the available bytes. According to a second variant, compatible with the first, the version j corresponding to the lower transmission binary bit rate (namely V1 in the example) is selected during the first time intervals in a way to converge as quickly as possible independently of the transmission bit rate available during the initialization phase. According to a third variant in which the number of bytes available in the time interval ti' enables downloading of the set of chunks i to be downloaded for this interval, an optimal version j is determined so that the ratio between the transmission bit rate respectively required by the different versions j and the available transmission bit rate is maximum, which results in the use of the maximum number of available bytes and is also called the available bytes optimization criterion.

During a step a), once the chunk to be downloaded is identified by its temporal index i and its version j, the device sends a request to the content server for the downloading of this chunk.

Finally during a step b), the chunk requested of the content server is then received by the content receiver.

In sequential mode, once the chunk is received, the set of steps is iterated for the next chunk i+1, namely to determine if the chunk i+1 should be downloaded before the end of the interval ti', to determine which version j of content to download followed by request for and reception of said chunk i+1.

According to an advantageous variant, once all of the chunks belonging to the set of chunks to be downloaded before the end of the temporal interval ti' have been downloaded, the remaining bandwidth for the temporal interval ti' (i.e. the number of bytes remaining as previously defined) is added to the estimated bandwidth for the next temporal interval ti'+1 (i.e. the estimated number of bytes) and used to anticipate the downloading of additional chunks.

Thus in a step, not shown in FIG. 6, reached when all the chunks belonging to the set of chunks to be downloaded before the end of the temporal interval ti' have been downloaded, the remaining available bytes, enabling additional chunks to be downloaded, are determined. Advantageously, for example, the number of bytes remaining available from the interval ti' and the number of estimated available bytes for the next time interval ti'+1 are determined. These bytes will be used for the downloading of additional chunks until a given index chunk is attained, for example i+2 that requires more bytes than are available. The downloading of remaining bytes of this chunk i+2 will be carried out during the next temporal interval ti'+1. During this step c) and as described previously, an estimation of the available bandwidth or transmission bit rate) is carried out from different measurements of bandwidth for the temporal intervals elapsed according to different variants of estimation models.

Then, the versions Vj are selected in a way to satisfy the available bytes optimization criterion. Finally during steps c) and d), the additional chunks are respectively requested from the server, then received by the content receiver.

Figure 7A:
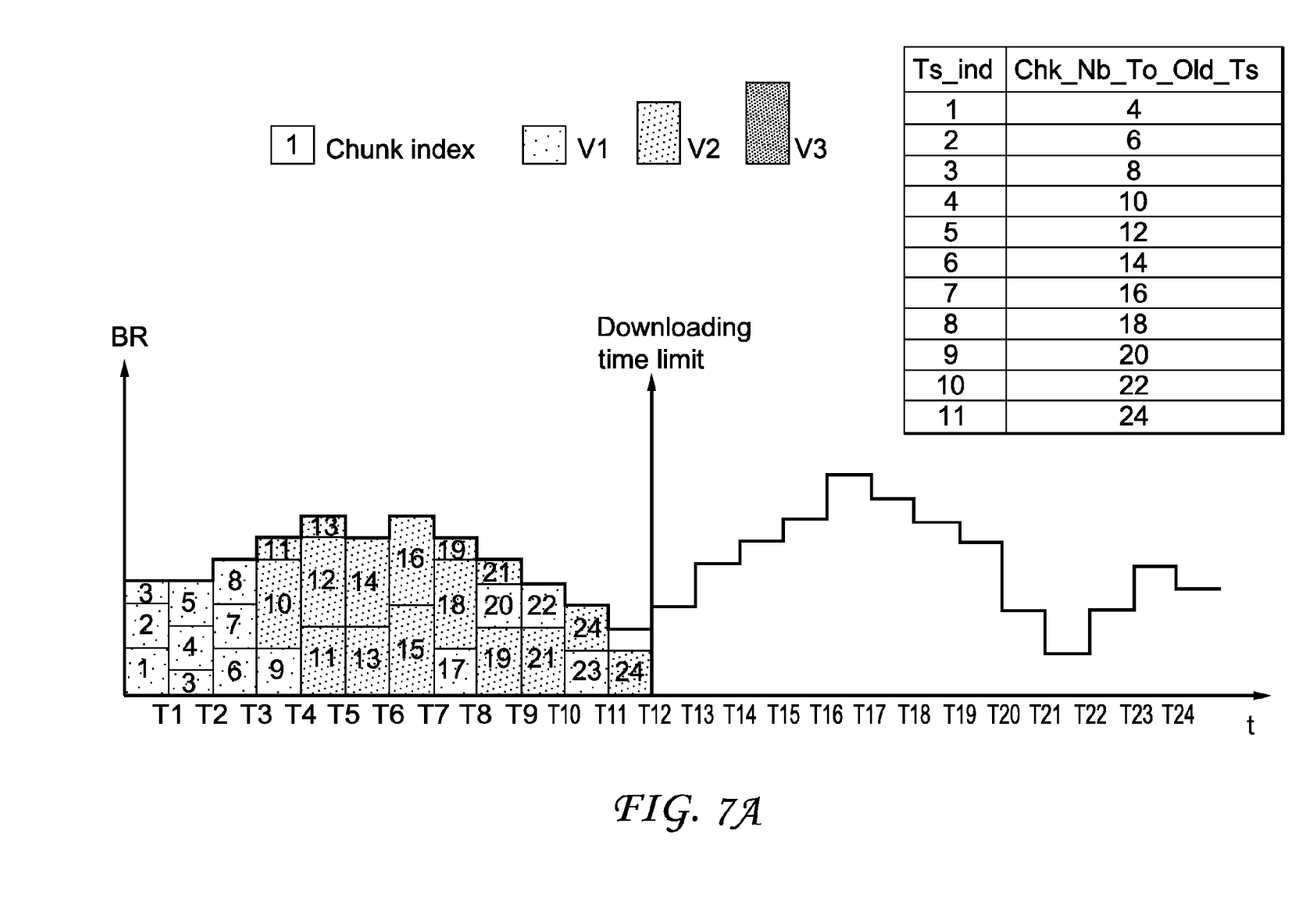
Figure 7B:
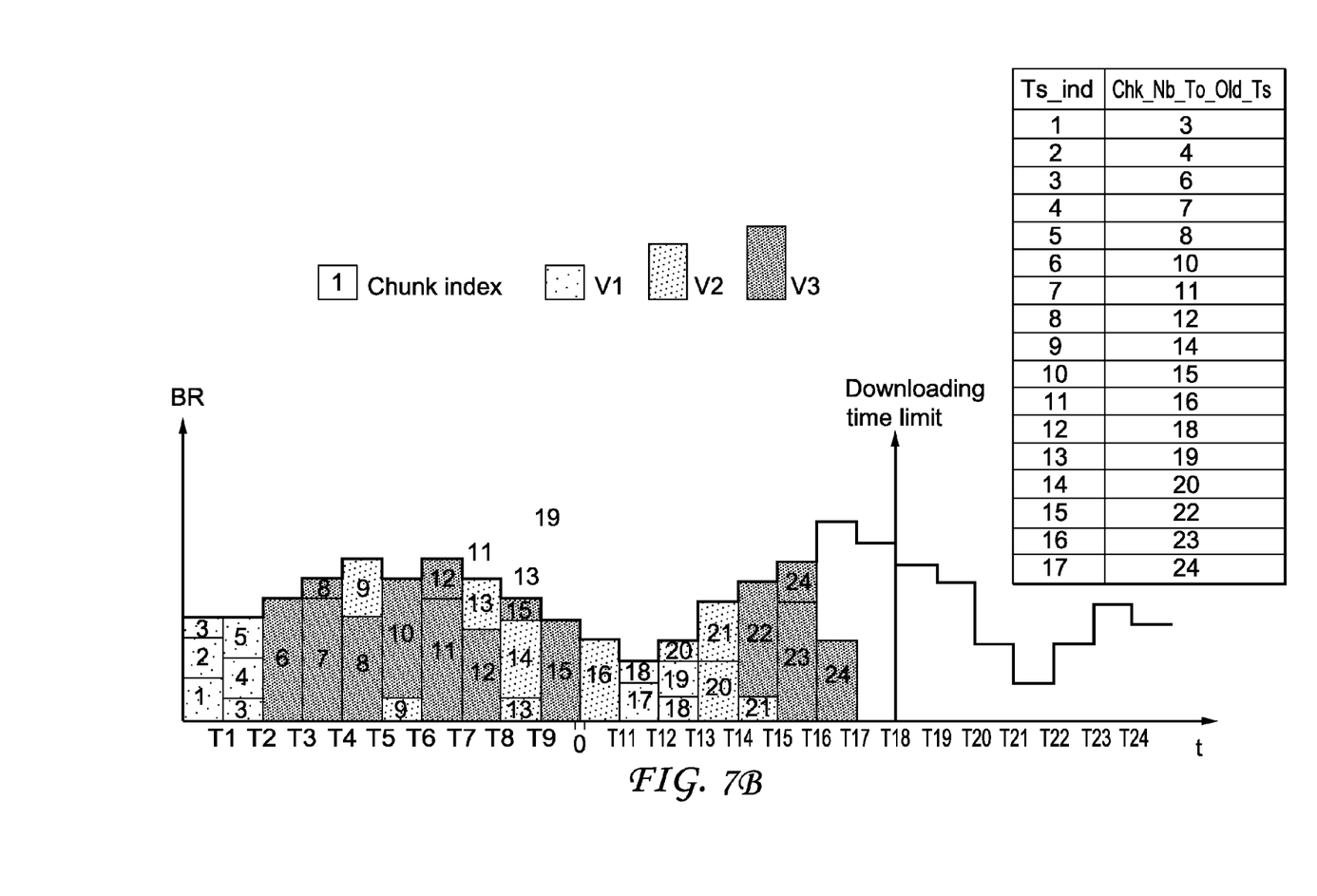
Figure 7C:
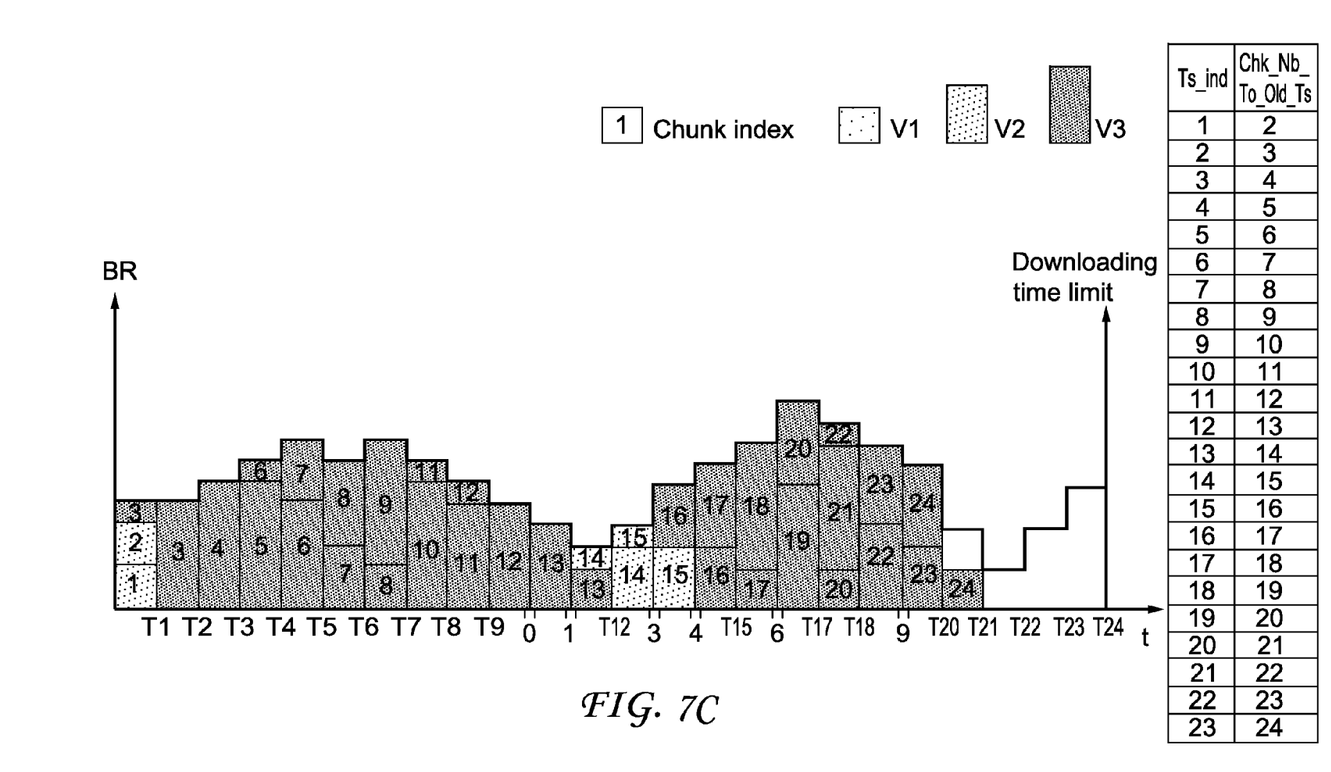

FIGS. 7a, 7b and 7c diagrammatically show an example of the progression law for obtaining of chunks of a content available in 3 versions of content Vj (of the type shown in FIG. 2) and obtained by a method for obtaining according to 3 embodiments of the invention. In the examples shown, the content of a duration equal to 24 temporal intervals must be downloaded according to a maximum download time limit, expressed in the number of temporal intervals, respectively set at 12, 18 and 24 intervals. The tables on the figures provide the correspondence between the index of downloaded chunks for a given temporal index i' according to the choice of versions V1 (minimum required bit rate), V2 (intermediate required bit rate) or V3 (maximum required bit rate). The illustration of different embodiment variants of the invention can be seen on the figures according to a given progression of the transmission bit rate and a given downloading duration limit.

The invention is not limited to the embodiments of the device for obtaining contents, the content receiver and the method for obtaining contents described above, only as an example, but it encompasses all the variants that those skilled in the art can envisage within the framework of the claims hereinafter.

The invention claimed is:

1. A method for downloading multimedia contents performed within a content receiver and comprising:
  sending a request to receive at least one chunk identified by an item of information representative of a temporal position i and by an item of information representative of a version j,
  determining said item of information representative of a temporal position i of a chunk to be downloaded before the end of a temporal interval ti' such that a maximum download duration of said content is divided into temporal intervals, and an average number of chunks to download per each temporal interval is determined in order to have a total download duration of said content less than the maximum download duration of said content, the determining further comprising:
    adding a guard interval, in chunks, to each of the temporal intervals, the guard interval being taken into account to determine a total number of chunks at any instant of the download for each of the temporal intervals, and corresponding to a margin taken over the total download duration, and
  determining said item of information representative of a version j according to an available transmission bit rate so that the chunk identified by the item of information representative of the determined temporal position i and by the item of information representative of the version j are downloaded before the end of the temporal interval ti', and
  receiving said identified chunk.

2. The method according to claim 1, wherein said sending, determining and receiving are iterated for a plurality of items of information representative of a temporal position i of chunks to be downloaded before the end of the temporal interval ti'.

3. The method according to claim 1, wherein for an initialization phase corresponding to a temporal interval ti' less than a first threshold, the item of information representative of a determined version j corresponds to the minimum required transmission bit rate whatever the available transmission bit rates.

4. The method according to claim 1, wherein the item of information representative of a determined version j corresponds to the minimum required transmission bit rate when the plurality of chunks identified by said items of information representative of a temporal position i to be downloaded before the end of the temporal interval ti' is not downloaded.

5. The method according to claim 2, wherein, when the plurality of chunks identified by said items of information representative of a temporal position i to be downloaded before the temporal interval ti' are downloaded, the method further comprises:
  sending a request to receive a chunk identified by an item of information representative of a determined following temporal position i+1 and by an item of information representative of a determined version j,
  determining for the chunk identified by the item of information representative of the following temporal position i+1, the item of information representative of a version j according to an available transmission bit rate so that the chunk identified by the item of information of temporal position i+1 and by the item of information representative of the determined version j are downloaded before the end of the temporal interval ti'+1,
  receiving said identified chunk.

6. The method according to claim 5, wherein the sending, determining and receiving are iterated until the end of the temporal interval ti'.

7. The method according to claim 1, wherein the sending, determining and receiving are iterated for a plurality of temporal intervals ti' so that the set of chunks of a content are downloaded.

8. The method according to claim 5, further comprising estimating the available transmission bit rate for the temporal interval ti'+1 from at least one measured value of transmission bit rate for the temporal interval ti'.

9. The method according to claim 8, wherein the estimation of the available transmission bit rate for the temporal interval ti'+1 further comprises allocating a constant value to the available transmission bit rate equal to a measured value of transmission bit rate for the temporal interval ti'.

10. The method according to claim 8, wherein the estimation of the available transmission bit rate further comprises allocating a value to the available transmission bit rate for the temporal interval ti'+1 as a linear function of two measured values of transmission bit rate for the preceding temporal intervals ti' and ti'−1.

11. The method according to claim 1, wherein said determining an item of information representative of a temporal position i of a chunk to be downloaded before the end of the temporal interval ti' further comprises varying a value of the guard interval during the download according to a level of advancement of the download.

12. The method according to claim 1, further comprising downloading of at least one descriptive file comprising an item of information representative of versions of a content and describing the respective required transmission bit rates.

13. A receiver for downloading multimedia content, comprising:
  a content obtaining device configured, for at least one temporal interval ti' corresponding to the duration of the chunk identified by an item of information representative of the temporal position i', to:
  send a request to receive at least one chunk identified by an item of information representative of a temporal position i and by an item of information representative of a version j,
  wherein said item of information representative of a temporal position i of a chunk to be downloaded before the end of the temporal interval ti' is determined such that a maximum download duration of said content is divided into temporal intervals, and an average number of chunks to download per each temporal interval is determined in order to have a total download duration of said content less than the maximum download duration of said content, the determining further comprising:
    adding a guard interval, in chunks, to each of the temporal intervals, the guard interval being taken into account to determine a total number of chunks at any instant of the download for each of the temporal intervals, and corresponding to a margin taken over the total download duration; and
  wherein said item of information representative of a version j is determined according to an available transmission bit rate so that the chunk identified by the item of information representative of the determined temporal position i and by the item of information representative of the version j are downloaded before the end of the temporal interval ti',
  receive said identified chunk.

14. The receiver according to claim 13, wherein said sending, determining and receiving performed by the content obtaining device are iterated for a plurality of items of information representative of a temporal position i of chunks to be downloaded before the end of the temporal interval ti'.

15. The receiver according to claim 13, wherein for an initialization phase corresponding to a temporal interval ti' less than a first threshold, the item of information representative of a determined version j corresponds to the minimum required transmission bit rate whatever the available transmission bit rates.

16. The receiver according to claim 13, wherein the item of information representative of a determined version j corresponds to the minimum required transmission bit rate when the plurality of chunks identified by said items of information representative of a temporal position i to be downloaded before the end of the temporal interval ti' is not downloaded.

17. The receiver according to claim 14, wherein, when the plurality of chunks identified by said items of information representative of a temporal position i to be downloaded before the temporal interval ti' are downloaded, the content obtaining device is further configured to:
  send a request to receive a chunk identified by an item of information representative of a determined following temporal position i+1 and by an item of information representative of a determined version j;
  determine for the chunk identified by the item of information representative of the following temporal position i+1, the item of information representative of a version j according to an available transmission bit rate so that the chunk identified by the item of information of temporal position i+1 and by the item of information representative of the determined version j are downloaded before the end of the temporal interval ti'+1; and
  receive said identified chunk.

18. The receiver according to claim 15, wherein the content obtaining device iterates the sending, determining and receiving until the end of the temporal interval ti'.

19. The receiver according to claim 15, wherein the content obtaining device iterates the sending, determining and receiving for a plurality of temporal intervals ti' so that the set of chunks of a content are downloaded.

20. The receiver according to claim 17, wherein the content obtaining device is further configured to estimate the available transmission bit rate for the temporal interval ti'+1 from at least one measured value of transmission bit rate for the temporal interval ti'.

21. The receiver according to claim 20, wherein the estimation of the available transmission bit rate for the temporal interval ti'+1 further comprises the allocation of a constant value to the available transmission bit rate equal to a measured value of transmission bit rate for the temporal interval ti'.

22. The receiver according to claim 20, wherein the estimation of the available transmission bit rate further comprises the allocation of a value to the available transmission bit rate for the temporal interval ti'+1 as a linear function of two measured values of transmission bit rate for the preceding temporal intervals ti' and ti'−1.

23. The receiver according to claim 13, wherein said determining an item of information representative of a temporal position i of a chunk to be downloaded before the end of the temporal interval ti' further comprises varying a value of the guard interval during the download according to a level of advancement of the download.

24. The receiver according to claim 13, wherein the content obtaining device is further configured to download at least one descriptive file comprising an item of information representative of versions of a content and describing the respective required transmission bit rates.

25. An apparatus for downloading multimedia content comprising:
  means for sending a request to receive at least one chunk identified by an item of information representative of a temporal position i and by an item of information representative of a version j,
  means for determining said item of information representative of a temporal position i of a chunk to be downloaded before the end of a temporal interval ti' such that a maximum download duration of said content is divided into temporal intervals, and an average number of chunks to download per each temporal interval is determined in order to have a total download duration of said content less than the maximum download duration of said content, the means for determining further comprising:
  adding a guard interval, in chunks, to each of the temporal intervals, the guard interval being taken into account to determine a total number of chunks at any instant of the download for each of the temporal intervals, and corresponding to a margin taken over the total download duration, and
  means for determining said item of information representative of a version j according to an available transmission bit rate so that the chunk identified by the item of information representative of the determined temporal position i and by the item of information representative of the version j are downloaded before the end of the temporal interval ti', and
  means for receiving said identified chunk.

26. The apparatus according to claim 25, wherein said means for sending, means for determining and means for receiving perform their respective functions iteratively for a plurality of items of information representative of a temporal position i of chunks to be downloaded before the end of the temporal interval ti'.

27. The apparatus according to claim 25, wherein for an initialization phase corresponding to a temporal interval ti' less than a first threshold, the item of information representative of a determined version j corresponds to the minimum required transmission bit rate whatever the available transmission bit rates.

28. The apparatus according to claim 25, wherein the item of information representative of a determined version j corresponds to the minimum required transmission bit rate when the plurality of chunks identified by said items of information representative of a temporal position i to be downloaded before the end of the temporal interval ti' is not downloaded.

29. The apparatus according to claim 26, wherein, when the plurality of chunks identified by said items of information representative of a temporal position i to be downloaded before the temporal interval ti' are downloaded, the apparatus further comprises:
  means for sending a request to receive a chunk identified by an item of information representative of a determined following temporal position i+1 and by an item of information representative of a determined version j;
  means for determining for the chunk identified by the item of information representative of the following temporal position i+1, the item of information representative of a version j according to an available transmission bit rate so that the chunk identified by the item of information of temporal position 1+1 and by the item of information representative of the determined version j are downloaded before the end of the temporal interval ti'+1; and
  means for receiving said identified chunk.

30. The apparatus according to claim 29, wherein the functions performed by said means for sending, means for determining and means for receiving are iteratively performed until the end of the temporal interval ti'.

31. The apparatus according to claim 25, wherein the functions performed by said means for sending, means for determining and means for receiving are iteratively performed for a plurality of temporal intervals ti' so that the set of chunks of a content are downloaded.

32. The apparatus according to claim 29, further comprising means for estimating the available transmission bit rate for the temporal interval ti'+1 from at least one measured value of transmission bit rate for the temporal interval ti'.

33. The apparatus according to claim 32, wherein the said means for estimating the available transmission bit rate for the temporal interval ti'+1 further comprises means for allocating a constant value to the available transmission bit rate equal to a measured value of transmission bit rate for the temporal interval ti'.

34. The apparatus according to claim 32, wherein the means for estimating the available transmission bit rate further comprises means for allocating a value to the available transmission bit rate for the temporal interval ti'+1 as a linear function of two measured values of transmission bit rate for the preceding temporal intervals ti' and ti'−1.

35. The apparatus according to claim 25, wherein said means for determining an item of information representative of a temporal position i of a chunk to be downloaded before the end of the temporal interval ti' further comprises means for varying a value of the guard interval during the download according to a level of advancement of the download.

36. The apparatus according to claim 25, further comprising means for downloading of at least one descriptive file comprising an item of information representative of versions of a content and describing the respective required transmission bit rates.

* * * * *